(12) United States Patent
Sun et al.

(10) Patent No.: US 12,317,195 B2
(45) Date of Patent: May 27, 2025

(54) METHOD AND APPARATUS FOR REPORTING REFERENCE SIGNAL RECEIVING POWER

(71) Applicant: LENOVO (BEIJING) LIMITED, Beijing (CN)

(72) Inventors: Zhennian Sun, Beijing (CN); Xiaodong Yu, Beijing (CN); Haipeng Lei, Beijing (CN); Lianhai Wu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 569 days.

(21) Appl. No.: 17/635,549

(22) PCT Filed: Aug. 15, 2019

(86) PCT No.: PCT/CN2019/100821
§ 371 (c)(1),
(2) Date: Feb. 15, 2022

(87) PCT Pub. No.: WO2021/026894
PCT Pub. Date: Feb. 18, 2021

(65) Prior Publication Data
US 2022/0338129 A1 Oct. 20, 2022

(51) Int. Cl.
*H04W 52/24* (2009.01)
*H04L 5/00* (2006.01)
(Continued)

(52) U.S. Cl.
CPC ......... *H04W 52/242* (2013.01); *H04L 5/0048* (2013.01); *H04W 24/08* (2013.01); *H04W 52/32* (2013.01); *H04W 64/00* (2013.01)

(58) Field of Classification Search
CPC ... H04W 52/242; H04W 24/08; H04W 52/32; H04W 64/00; H04W 76/40; H04W 76/14;
(Continued)

(56) References Cited

U.S. PATENT DOCUMENTS

| 2020/0112400 A1* | 4/2020 | Lee | H04L 1/1819 |
| 2021/0051505 A1* | 2/2021 | Xu | H04W 4/023 |
| 2022/0061079 A1* | 2/2022 | Lee | H04L 5/0023 |

FOREIGN PATENT DOCUMENTS

| CN | 109644455 A | 4/2019 |
| WO | 2017055157 A1 | 4/2017 |

OTHER PUBLICATIONS

U.S. Appl. No. 62/843,353,Specification_-_Not_in_English,May 3, 2019 (Year: 2019).*
(Continued)

*Primary Examiner* — Ji-Hae Yea
(74) *Attorney, Agent, or Firm* — Kunzler Bean & Adamson (57) ABSTRACT

The present application relates to user equipment and a method for reporting reference signal receiving power (RSRP). A user equipment transmits a reference signal to another user equipment. After receiving the reference signal, another user equipment measures the reference signal for determining an RSRP. Another user equipment then transmits the RSRP and an attribute information corresponding to the RSRP to the user equipment. The user equipment receives the RSRP and the attribute information. The attribute information includes a geographic information, a type information of the RSRP, or a combination of the geographic information and the type information.

20 Claims, 10 Drawing Sheets

(51) Int. Cl.
*H04W 24/08* (2009.01)
*H04W 52/32* (2009.01)
*H04W 64/00* (2009.01)

(58) Field of Classification Search
CPC ...... H04B 17/24; H04B 17/27; H04B 17/318; H04B 17/328; H04L 5/0048; H04L 5/0057
See application file for complete search history.

(56) References Cited

OTHER PUBLICATIONS

U.S. Appl. No. 62/843,355,Specification_-_Not_in_English,May 3, 2019 (Year: 2019).*
U.S. Appl. No. 62/886,626,Specification,Aug. 14, 2019 (Year: 2019).*
U.S. Appl. No. 62/886,626,Drawings-only_black_and_white_line_drawings,Aug. 14, 2019 (Year: 2019).*
U.S. Appl. No. 62/741,474,Specification_-_Not_in_English,Oct. 4, 2018 (Year: 2019).*
U.S. Appl. No. 62/741,474,Specification,Dec. 3, 2019 (Year: 2019).*
U.S. Appl. No. 62/843,353,Specification,Nov. 2, 2021 (Year: 2021).*
U.S. Appl. No. 62/843,355,Specification,Nov. 2, 2021 (Year: 2021).*
International Searching Authority, "Written Opinion of the International Searching Authority," PCT/CN2019/100821, May 9, 2020, pp. 1-4.
Lenovo, Motorola Mobility, HARQ feedback impact on RAN2, 3GPP TSG RAN WG2 #106, R2-1907148, May 13-17, 2019, pp. 1-4, Reno, USA.

* cited by examiner

METHOD AND APPARATUS FOR REPORTING REFERENCE SIGNAL RECEIVING POWER

TECHNICAL FIELD

The present disclosure generally relates to reporting of Reference Signal Receiving Power (RSRP), and relates more particularly to reporting of RSRP for sidelink transmission.

BACKGROUND OF THE INVENTION

For controlling the interference and increasing the power efficiency of sidelink transmission, techniques of sidelink power control are introduced. With the sidelink power control, user equipment can utilize downlink path loss, sidelink path loss, or a combination of downlink path loss and sidelink path loss to adjust the transmitting power for different network conditions.

To estimate sidelink path loss, reporting of Reference Signal Receiving Power (RSRP) for sidelink transmission is necessary. However, specific details of reporting RSRP for sidelink transmission have not been discussed yet and there are still some issues that need to be solved.

BRIEF SUMMARY OF THE INVENTION

One embodiment of the present disclosure provides a method of a user equipment. The method includes: receiving a reference signal from another user equipment; measuring the reference signal for determining a reference signal receiving power (RSRP); and transmitting an attribute information corresponding to the RSRP to the another user equipment, wherein the attribute information includes a geographic information of the user equipment, a type information of the RSRP, or a combination of the geographic information and the type information.

Another embodiment of the present disclosure provides a method of a user equipment. The method includes: transmitting a reference signal to another user equipment so that the another user equipment is capable of measuring the reference signal for determining an RSRP; and receiving an attribute information corresponding to the RSRP from the another user equipment, wherein the attribute information includes a geographic information of the user equipment, a type information of the RSRP, or a combination of the geographic information and the type information.

Yet another embodiment of the present disclosure provides an apparatus. According to an embodiment of the present disclosure, the apparatus includes: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions are configured to, with the at least one processor, cause the apparatus to perform a method according to an embodiment of the present disclosure.

BRIEF DESCRIPTION OF THE DRAWINGS

In order to describe the manner in which advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION OF THE INVENTION

The detailed description of the appended drawings is intended as a description of preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Figure 1:
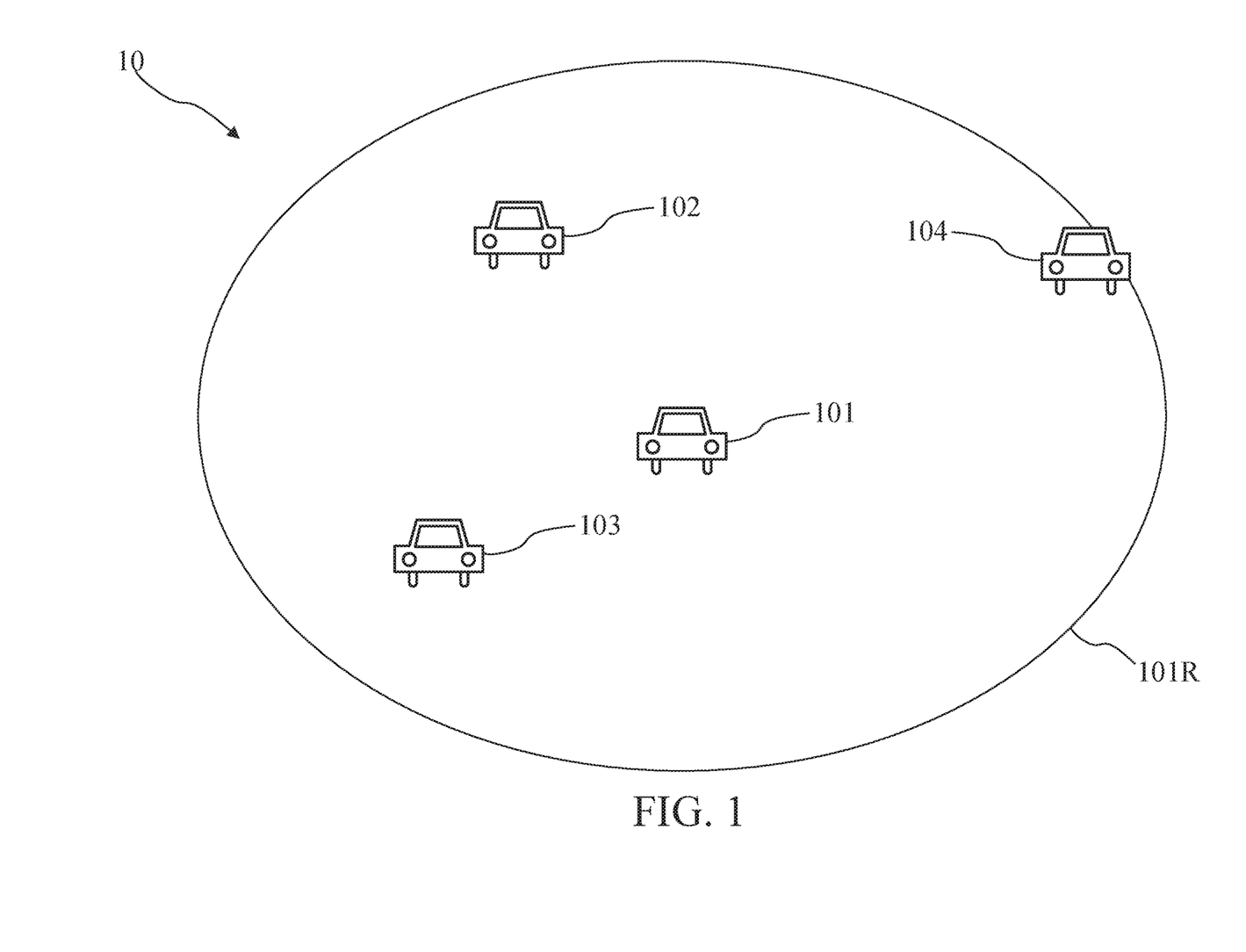
FIG. 1 illustrates a wireless communication system according to an embodiment of the present disclosure.

Referring to FIG. 1, a wireless communication system 10 may include user equipment (UE) 101, 102, 103 and 104 which may communicate with each other according to protocol of sidelink (SL) transmission. In some embodiments, UEs 101, 102, 103 and 104 may be grouped into a group. UEs 101, 102, 103 and 104 of the group may be configured to perform groupcast communication.

It is contemplated that the wireless communication system 10 may include more or fewer UEs in accordance with some other embodiments of the disclosure. Although each of the UEs in FIG. 1 is shown in the shape of a car and may be referred to as Vehicle to everything (V2X) UE under a New Radio (NR) network, it should be noted that the wireless communication system 10 may include any type of UE (e.g. a cell phone, a computer, a laptop, an Internet of Things device or another type of device), and may adopt various service scenarios, for example but not limited to, 3GPP 5G NR, 3GPP Long Term Evolution (LTE) Release 12 and up, etc.

In some embodiments, in a group including UEs 101, 102, 103 and 104, UE 101 may function as a source UE (i.e., a transmitting UE, a TX UE, etc.), and each of UEs 102, 103 and 104 may function as a member UE (i.e., a receiving UE, an RX UE, etc.). UE 101 may transmit a groupcast message or a groupcast packet to UEs 102, 103 and 104 within the group. UEs 102, 103 and 104 within a groupcast range 101R of UE 101 may receive the groupcast message or the groupcast packet from UE 101.

According to the protocol of SL transmission of the wireless communication system 10, UEs 102, 103 and 104 may report a Reference Signal Receiving Power (RSRP) to UE 101 for UE 101 to estimate path losses between UE 101 and UEs 102, 103 and 104. However, specific details of reporting RSRP for the protocol of SL transmission have not been discussed yet and there are still some issues that need to be solved.

Figure 2:
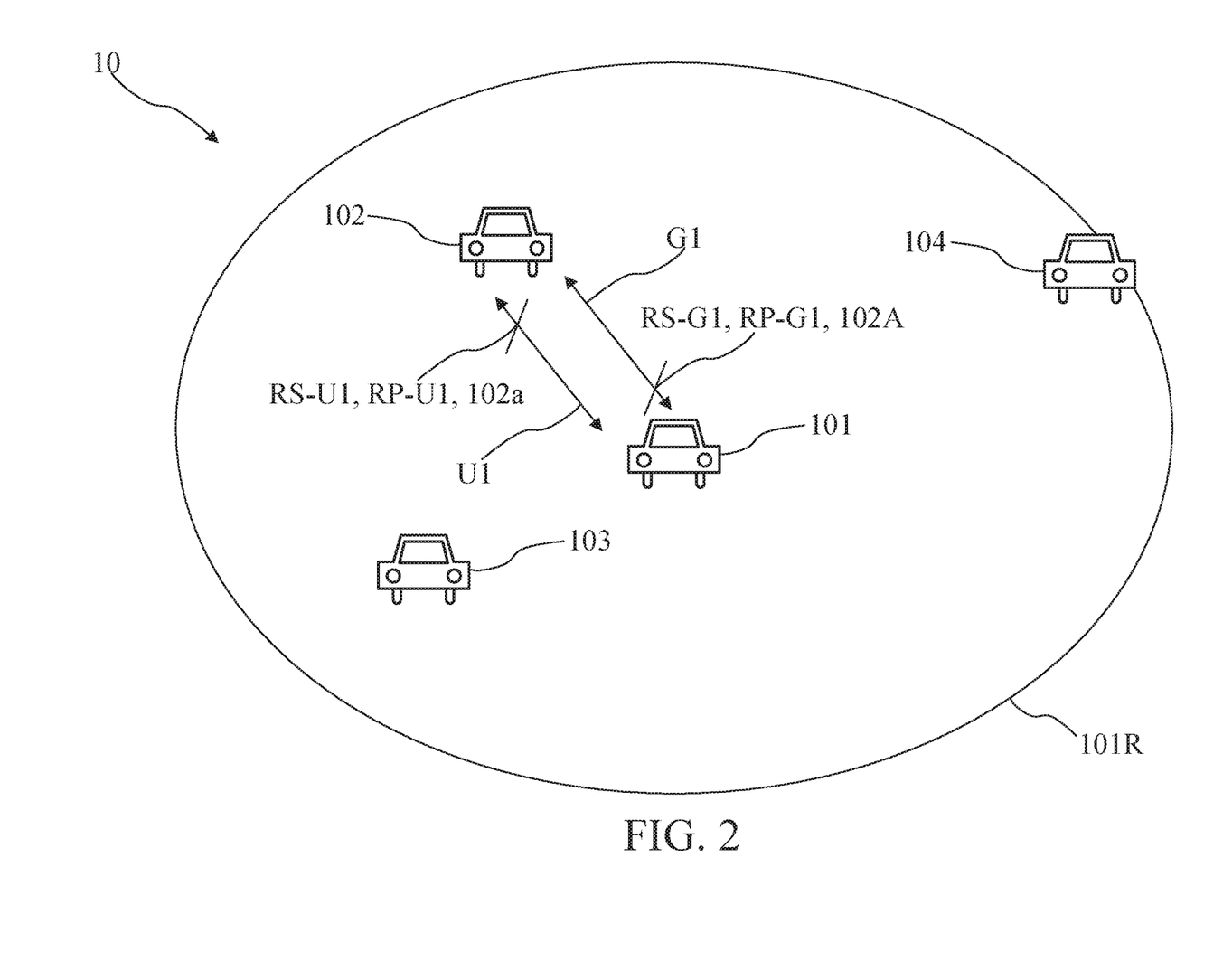
FIG. 2 illustrates a wireless communication system according to an embodiment of the present disclosure.

Referring to FIG. 2, in some embodiments, UE 101 may perform a groupcast communication G1 with UE 102; meanwhile, UE 101 may perform a unicast communication U1 with UE 102. Because the groupcast communication G1 and the unicast communication U1 have different transmitting power requirements, transmitting power for transmitting messages via the groupcast communication G1 may be different from transmitting power for transmitting messages via the unicast communication U1.

In particular, for satisfying the unicast communication U1, transmitting power of UE 101 may be adjusted mainly according to a path loss between UE 101 and UE 102. More specifically, if UE 101 estimates the greater path loss between UE 101 and UE 102, then such estimation indicates that the quality of the unicast communication 101U is getting worse. Accordingly, the transmitting power of UE 101 may be adjusted to be greater for satisfying the unicast communication U1.

On the other hands, for satisfying the groupcast communication G1, the transmitting power of UE 101 may be adjusted according to a path loss between UE 101 and the UE(s) which may be at the edge of a group of UE 102, 103 and 104 (e.g., UE 104 shown in FIG. 2). In other words, for communicating with all UEs of the group, the transmitting power of UE 101 may be adjusted to be high enough for communicating with the UE(s) at the edge of the group (e.g., UE 104 shown in FIG. 2).

Accordingly, path losses corresponding to the groupcast communication G1 and the unicast communication U1 should be distinguished so that the transmitting powers for the groupcast communication G1 and the unicast communication U1 can be adjusted respectively and correctly. Because path losses are estimated according to a corresponding RSRP, UE(s) that report the RSRP should indicate that the reported RSRP corresponds to the groupcast communication G1 or the unicast communication U1.

In some embodiments, UE 101 may transmit a reference signal RS-G1 to UE 102. The reference signal RS-G1 corresponds to the groupcast communication G1 between UE 101 and UE 102. Accordingly, UE 102 may measure the reference signal RS-G1 for determining an RSRP RP-G1. In some embodiments, while UE 102 transmits the RSRP RP-G1 to UE 101 for UE 101 to determine a corresponding path loss, UE 102 may transmit an attribute information 102A to UE 101 for informing UE 101 of some information associated with the RSRP RP-G1.

In some embodiments, the attribute information 102A may include a type information of the RSRP RP-G1. In particular, because the RSRP RP-G1 corresponds to the groupcast communication G1, the type information may be utilized to indicate that the RSRP RP-G1 corresponds to the groupcast communication G1. Accordingly, when UE 101 receives the attribute information 102A including the type information, UE 101 may be informed that the RSRP RP-G1 corresponds to the groupcast communication G1.

In some implementations, UE 102 may embed the RSRP RP-G1 into a Medium Access Control-Control Element (MAC-CE) (not shown), and transmit the MAC-CE (not shown) to UE 101 for reporting the RSRP RP-G1. In such implementations, the type information may be a logical channel identification (LCID) of the MAC-CE, and the LCID of the MAC-CE may be used for indicating that the RSRP RP-G1 embedded in the MAC-CE corresponds to the groupcast communication G1.

In some implementations, UE 102 may transmit the RSRP RP-G1 to UE 101 via a Physical Sidelink Shared Channel (PSSCH). Because the PSSCH is between UE 101 and UE 102, a corresponding Physical Sidelink Control Channel (PSCCH) may exist between UE 101 and UE 102. The PSCCH may be used for transmitting a Sidelink Control Information (SCI) between UE 101 and UE 102. In such implementations, the type information may be an indicator for indicating that the RSRP RP-G1 corresponds to the groupcast communication G1. The indicator may be transmitted with the SCI to UE 101 via the PSCCH.

In some embodiments, UE 102 may receive another SCI from UE 101. The SCI may include a flag. The flag may indicate that a plurality of occasions (not shown) is scheduled for the groupcast communication G1. In detail, the flag of the SCI may be utilized for indicating to UE 102 that UE 102 may measure the reference signal RS-G1 during these occasions. After measuring the reference signal RS-G1 during the occasions, UE 102 may determine the RSRP RP-G1.

More specifically, in such embodiments, UE 102 may measure the RSRP RP-G1 on the reference signal RS-G1 if the flag in the received SCI indicates that these occasions for transmission/reception may be used for RSRP measurement. Then, UE 102 may transmit the RSRP RP-G1 to UE 101. After receiving the RSRP RP-G1, UE 101 may determine that the RSRP RP-G1 corresponds to the groupcast communication G1 because the occasions used for UE 102 to measure the RSRP RP-G1 are scheduled for the groupcast communication G1.

In some embodiments, UE 101 may transmit a reference signal RS-U1 to UE 102. The reference signal RS-U1 corresponds to the unicast communication U1 between UE 101 and UE 102. Accordingly, UE 102 may measure the reference signal RS-U1 for determining an RSRP RP-U1. In some embodiments, while UE 102 transmits the RSRP RP-U1 to UE 101 for UE 101 to determine a corresponding path loss, UE 102 may transmit an attribute information 102a to UE 101 for informing UE 101 of some information associated with the RSRP RP-U1.

In some embodiments, the attribute information 102a may include a type information of the RSRP RP-U1. In particular, because the RSRP RP-U1 corresponds to the unicast communication U1, the type information may be utilized to indicate that the RSRP RP-U1 corresponds to the unicast communication U1. Accordingly, when UE 101 receives the attribute information 102a including the type information, UE 101 may be informed that the RSRP RP-U1 corresponds to the unicast communication U1.

In some implementations, UE 102 may embed the RSRP RP-U1 into a MAC-CE (not shown), and transmit the MAC-CE to UE 101 for reporting the RSRP RP-U1. In such implementations, the type information may be an LCID of the MAC-CE, and the LCID of the MAC-CE may be used for indicating that the RSRP RP-U1 embedded in the MAC-CE corresponds to the unicast communication U1.

In some implementations, UE 102 may transmit the RSRP RP-U1 to UE 101 via the PSSCH. In such implementations, the type information may be an indicator for indicating that the RSRP RP-U1 corresponds to the unicast communication U1. The indicator may be transmitted with the SCI to UE 101 via the PSCCH that corresponds to the PSSCH.

In some embodiments, UE 102 may receive another SCI from UE 101. The SCI may include a flag, and the flag may indicate that a plurality of occasions (not shown) is scheduled for the unicast communication U1. In detail, the flag of the SCI may be utilized for indicating to UE 102 that UE 102 may measure the reference signal RS-U1 during these occasions. After measuring the reference signal RS-U1 during the occasions, UE 102 may determine the RSRP RP-U1.

More specifically, in such embodiments, UE 102 may measure the RSRP RP-U1 on the reference signal RS-U1 if the flag in the received SCI indicates that these occasions for transmission/reception may be used for RSRP measurement. Then, UE 102 may transmit the RSRP RP-U1 to UE 101. After receiving the RSRP RP-U1, UE 101 may determine that the RSRP RP-U1 corresponds to the unicast communication U1 because the occasions used for UE 102 to measure the RSRP RP-U1 are scheduled for the unicast communication U1.

Figure 3:
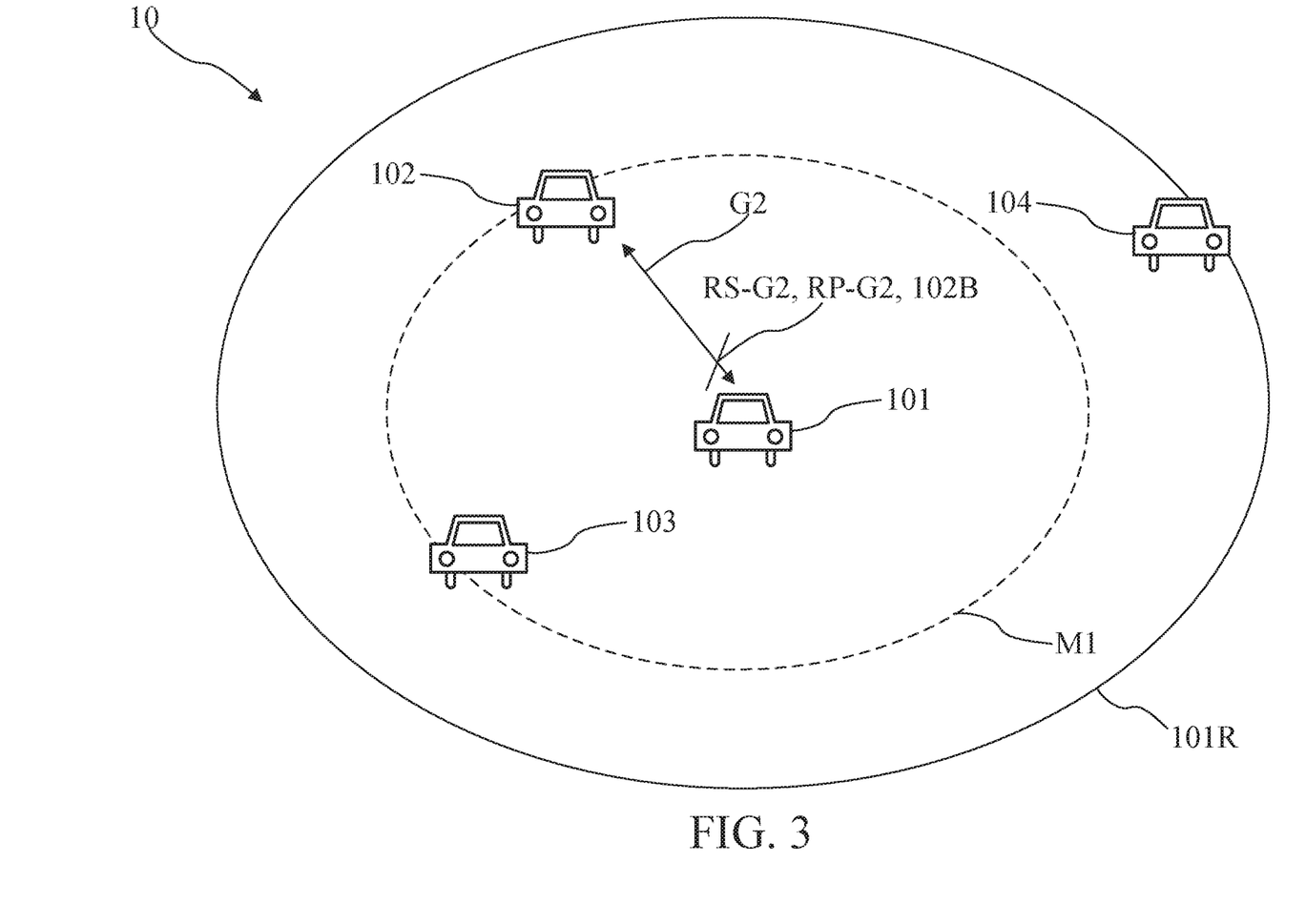
FIG. 3 illustrates a wireless communication system according to an embodiment of the present disclosure.

Referring to FIG. 3, in some embodiments, a service of a groupcast communication G2 may be provided by UE 101 to UEs 102, 103 and 104 of a group. The service of groupcast communication G2 may be configured to be provided within a Minimum Communication Range (MCR) M1.

It should be noted that, because UE 101 may provide the service of the groupcast communication G2 only within the MCR M1, UE 101 may ignore the UE(s) that are not within the MCR M1. Therefore, UE 101 may not need to estimate the path loss between UE 101 and the UE(s) that are not within the MCR M1. In other words, UE 101 may not need the RSRP(s) reported from the UE(s) that are not within the MCR M1.

On the other hand, UE 101 may provide the service of the groupcast communication G2 to the UE(s) that are within the MCR M1. Therefore, UE 101 may need to estimate the path loss between UE 101 and the UE(s) that are within the MCR M1. In other words, UE 101 may need the RSRP(s) reported from the UE(s) that are within the MCR M1.

In some embodiments, UE 101 may transmit a reference signal RS-G2 to UE 102. The reference signal RS-G2 corresponds to the service of the groupcast communication G2 between UE 101 and UE 102. Accordingly, UE 102 may measure the reference signal RS-G2 for determining a RSRP RP-G2. In some embodiments, while UE 102 transmits the RSRP RP-G2 to UE 101 for UE 101 to determine a corresponding path loss, UE 102 may transmit an attribute information 102B to UE 101 for UE 101 to determine whether to calculate the corresponding path loss.

In some embodiments, the attribute information 102B may include a geographic information of UE 102. In detail, the geographic information may indicate a distance information between UE 101 and UE 102. The distance information may be transmitted with the RSRP RP-G2 to UE 101.

In some embodiments, UE 102 may calculate the distance information first. In particular, before receiving the attribute information 102B, UE 101 may transmit a location information to UE 102. The location information may include a zone identification, which includes latitude and longitude coordinates, of UE 101. After receiving the location information of UE 101, UE 102 may calculate the distance information between UE 101 and UE 102 according to the zone identification of UE 101 and a zone identification of UE 102.

Accordingly, after receiving the distance information, UE 101 may determine whether UE 102 is within the MCR M1 of the service of the groupcast communication G2. When UE 101 determines that UE 102 is within the MCR M1 of the service of the groupcast communication G2, UE 101 may calculate a path loss between UE 101 and UE 102 according to the RSRP RP-G2.

In some embodiments, UE 102 may transmit the RSRP RP-G2 via a PSSCH. The geographic information may be transmitted with an SCI via a PSCCH corresponding to the PSSCH.

In some embodiments, the distance information may include an absolute distance value (e.g., 10 meters) or a quantized distance value. For example, the quantized distance value may be determined as indicated in the following table:

| quantized distance value | absolute distance value |
|---|---|
| 0000 | less than 10 meters |
| 0001 | between 10 meters and 20 meters |
| 0010 | between 20 meters and 30 meters |
| 0011 | between 30 meters and 40 meters |
| 0100 | between 40 meters and 50 meters |
| ... | ... |

In some embodiments, UE 102 may be notified of the MCR M1. The distance information may include another quantized distance value as indicated in the following table:

| quantized distance value | percentage of MCR M1 |
|---|---|
| 0000 | less than 10% of M1 |
| 0001 | between 10% of M1 and 20% of M1 |
| 0010 | between 20% of M1 and 30% of M1 |
| 0011 | between 30% of M1 and 40% of M1 |
| 0100 | between 40% of M1 and 50% of M1 |
| ... | ... |

In some embodiments, the attribute information 102B may include another geographic information of UE 102. In detail, the geographic information may indicate a location information of UE 102. UE 101 may calculate a distance information between UE 101 and UE 102 accordingly.

In particular, UE 102 may transmit the location information of UE 102 to UE 101. The location information may include a zone identification, which includes latitude and longitude coordinates, of UE 102. After receiving the location information, UE 101 may calculate the distance information between UE 101 and UE 102 according to the zone identification of UE 102 and a zone identification of UE 101.

Accordingly, after calculating the distance information, UE 101 may determine whether UE 102 is within the MCR M1 of the service of the groupcast communication G2. When UE 101 determines that UE 101 is within the MCR M1 of the service of the groupcast communication G2, UE 101 may calculate a path loss between UE 101 and UE 102 according to the RSRP RP-G2.

Figure 4:
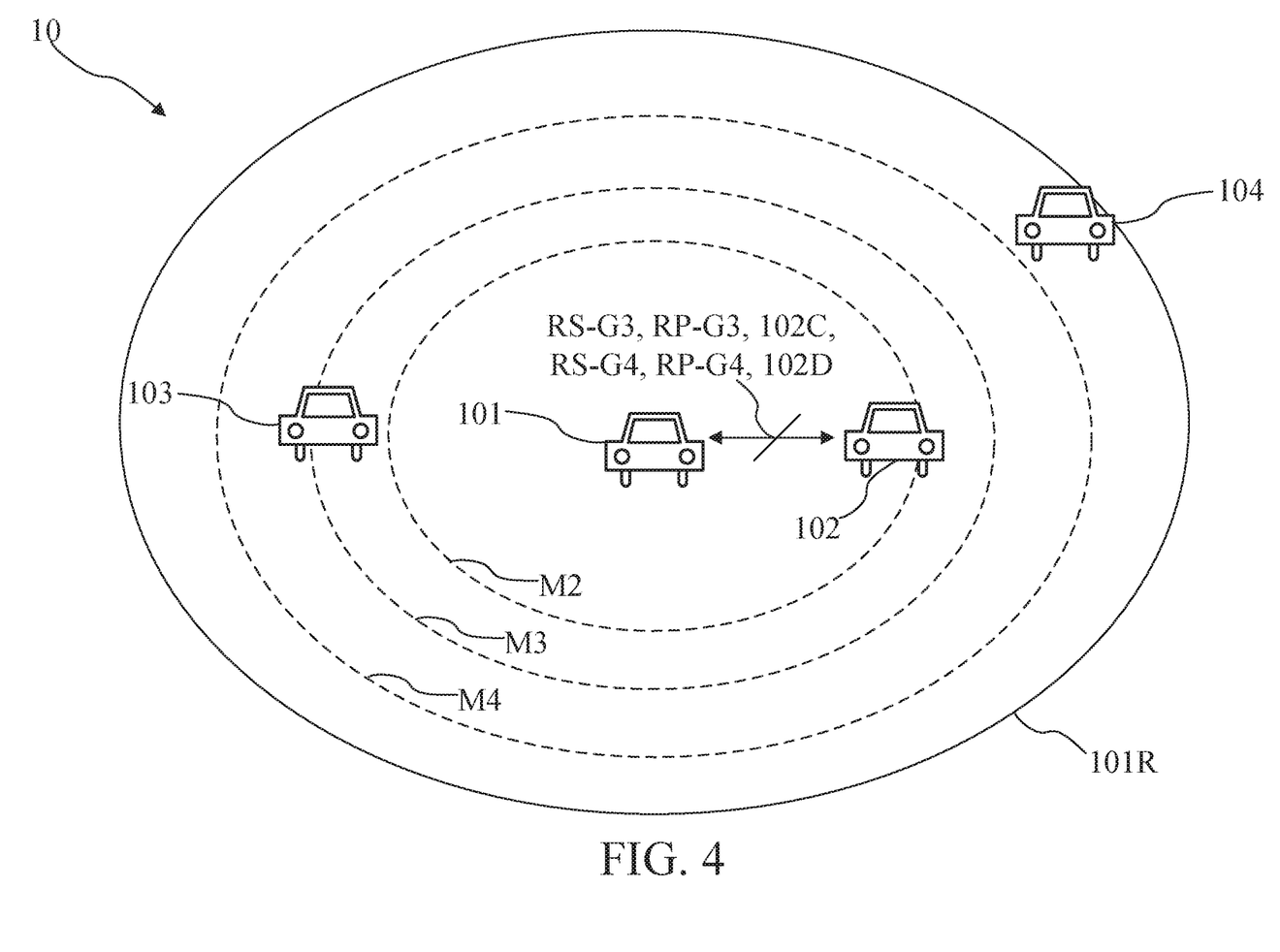
FIG. 4 illustrates a wireless communication system according to an embodiment of the present disclosure.

Referring to FIG. 4, in some embodiments, UE 101 may perform groupcast with UEs 102, 103 and 104 of the group. In this group, UE 101 may provide multiple services to UEs 102, 103 and 104. Each service corresponds to one MCR. In such embodiments, three services may be provided. The services correspond to MCRs M2, M3 and M4 respectively. Because the services have different MCRs, transmitting powers for transmitting messages for the services may be different.

Accordingly, path losses corresponding to the services with different MCRs should be distinguished so that the transmitting powers for the services with different MCRs can be adjusted respectively and correctly. Because path losses are estimated according to a corresponding RSRP, UE(s) that report the RSRP should indicate the service to which the reported RSRP corresponds.

In some embodiments, UE 101 may transmit a reference signal RS-G3 to UE 102. The reference signal RS-G3 corresponds to the service with MCR M2. Accordingly, UE 102 may measure the reference signal RS-G3 for determining a RSRP RP-G3. In some embodiments, while UE 102 transmits the RSRP RP-G3 to UE 101 for UE 101 to determine a corresponding path loss, UE 102 may transmit an attribute information 102C to UE 101 for informing UE 101 of some information associated with the RSRP RP-G3.

In some embodiments, the attribute information 102C may include a type information of the RSRP RP-G3. In particular, because the RSRP RP-G3 corresponds to the service with MCR M2, the type information may be utilized to indicate that the RSRP RP-G3 corresponds to the service with MCR M2. Accordingly, when UE 101 receives the attribute information 102C including the type information, UE 101 may be informed that the RSRP RP-G3 corresponds to the service with MCR M2.

In some implementations, UE 102 may embed the RSRP RP-G3 into a MAC-CE (not shown), and UE 102 may transmit the MAC-CE to UE 101 for reporting the RSRP RP-G3. In such embodiments, the type information may be an LCID of the MAC-CE, and the LCID of the MAC-CE may be used for indicating that the RSRP RP-G3 embedded in the MAC-CE corresponds to the service with MCR M2.

In some implementations, UE 102 may transmit the RSRP RP-G3 to UE 101 via the PSSCH. In such implementations, the type information may be an indicator for indicating that the RSRP RP-G3 corresponds to the service with MCR M2. The indicator may be transmitted with the SCI to UE 101 via the PSCCH that corresponds to the PSSCH.

In some embodiments, UE 102 may receive another SCI from UE 101. The SCI may include a flag. The flag may indicate that a plurality of occasions (not shown) is scheduled for the service with MCR M2. In detail, the flag of the SCI may be utilized for indicating to UE 102 that UE 102 may measure the reference signal RS-G3 during the occasions. After measuring the reference signal RS-G3 during the occasions, UE 102 may determine the RSRP RP-G3.

More specifically, in such embodiments, UE 102 may measure the RSRP RP-G3 on the reference signal RS-G3 if the flag in the received SCI indicates that these occasions for transmission/reception may be used for RSRP measurement. Then, UE 102 may transmit the RSRP RP-G3 to UE 101. After receiving the RSRP RP-G3, UE 101 may determine that the RSRP RP-G3 corresponds to the service with MCR M2 because the occasions used for UE 102 to measure the RSRP RP-G3 are scheduled for the service with MCR M2.

In some embodiments, UE 101 may transmit a reference signal RS-G4 to UE 102. The reference signal RS-G4 corresponds to the service with MCR M3. Accordingly, UE 102 may measure the reference signal RS-G4 for determining a RSRP RP-G4. In some embodiments, while UE 102 transmits the RSRP RP-G4 to UE 101 for UE 101 to determine a corresponding path loss, UE 102 may transmit an attribute information 102D to UE 101 for informing UE 101 of some information associated with the RSRP RP-G4.

In some embodiments, the attribute information 102D may include a type information of the RSRP RP-G4. In particular, because the RSRP RP-G4 corresponds to the service with MCR M3, the type information may be utilized to indicate that the RSRP RP-G4 corresponds to the service with MCR M3. Accordingly, when UE 101 receives the attribute information 102D including the type information, UE 101 may be informed of that the RSRP RP-G4 corresponds to the service with MCR M3.

In some implementations, UE 102 may embed the RSRP RP-G4 into a MAC-CE (not shown), and transmit the MAC-CE to UE 101 for reporting the RSRP RP-G4. In such implementations, the type information may be an LCID of the MAC-CE, and the LCID of the MAC-CE may be used for indicating that the RSRP RP-G4 embedded in the MAC-CE corresponds to the service with MCR M3.

In some implementations, UE 102 may transmit the RSRP RP-G4 to UE 101 via the PSSCH. In such implementations, the type information may be an indicator for indicating that the RSRP RP-G4 corresponds to the service with MCR M3. The indicator may be transmitted with the SCI to UE 101 via the PSCCH that corresponds to the PSSCH.

In some embodiments, UE 102 may receive another SCI from UE 101. The SCI may include a flag indicating that a plurality of occasions (not shown) is scheduled for the service with MCR M3. In detail, the flag of the SCI may be utilized for indicating to UE 102 that UE 102 may measure the reference signal RS-G4 during the occasions. After measuring the reference signal RS-G4, UE 102 may determine the RSRP RP-G4.

More specifically, in such embodiments, UE 102 may measure the RSRP RP-G4 on the reference signal RS-G4 if the flag in the received SCI indicates that these occasions for transmission/reception may be used for RSRP measurement. Then, UE 102 may transmit the RSRP RP-G4 to UE 101. After receiving the RSRP RP-G4, UE 101 may determine that the RSRP RP-G4 corresponds to the service with MCR M3 because the occasions used for UE 102 to measure the RSRP RP-G4 are scheduled for the service with MCR M3.

In some embodiments, UE 101 may embed an indication of transmitting power in an SCI associated with a reference signal for RSRP measurement to UE 102, 103 or 104 of a group. When UE 102, 103 or 104 receives the indication of transmitting power, UE 102, 103 or 104 may perform RSRP normalization across the different RSRP measurement occasions regardless of the cast type. UE 102, 103 or 104 may need to report one RSRP to UE 101. The reported RSRP is normalized according to a designated transmitting power. The designated transmitting power may be a default value (e.g., 0 dBm), a maximum transmitting power (e.g., 23 dBm) of UE 101, or a pre-configured value configured by a base station or another user equipment.

In particular, UE 101 may transmit the SCI to UE 102. The SCI may include the indication of transmitting power of UE 101. After receiving the SCI including the indication of transmitting power, UE 102 may normalize a RSRP according to the designated transmitting power. Next, UE 102 may transmit the normalized RSRP to UE 101.

For example, UE 101 may transmit an SCI including an indication of the transmitting powers P1, P2, P3 and P4 for four occasions. The measured RSRP may be RSRP1, RSRP2, RSRP3 and RSRP4 respectively. There may be a designated transmitting power $P_{normalization}$ for RSRP normalization. In detail, UE 102 may perform RSRP normalization for determining a normalized RSRP NP according to the indicated transmitting powers, measured RSRPs and the designated transmitting power.

In particular, the normalized RSRP NP is determined based on following formula:

$$NP = P_{normalization} - \text{mean}(P1-RSRP1, P2-RSRP2, P3-RSRP3, P4-RSRP4)$$

The normalized RSRP NP is derived from subtracting the mean value of P1-RSRP1, P2-RSRP2, P3-RSRP3 and P4-RSRP4 from $P_{normalization}$.

Then, UE 101 may estimate a path loss PL according to the normalized RSRP NP and $P_{normalization}$ based on following formula:

$$PL = P_{normalization} - NP$$

Figure 5:
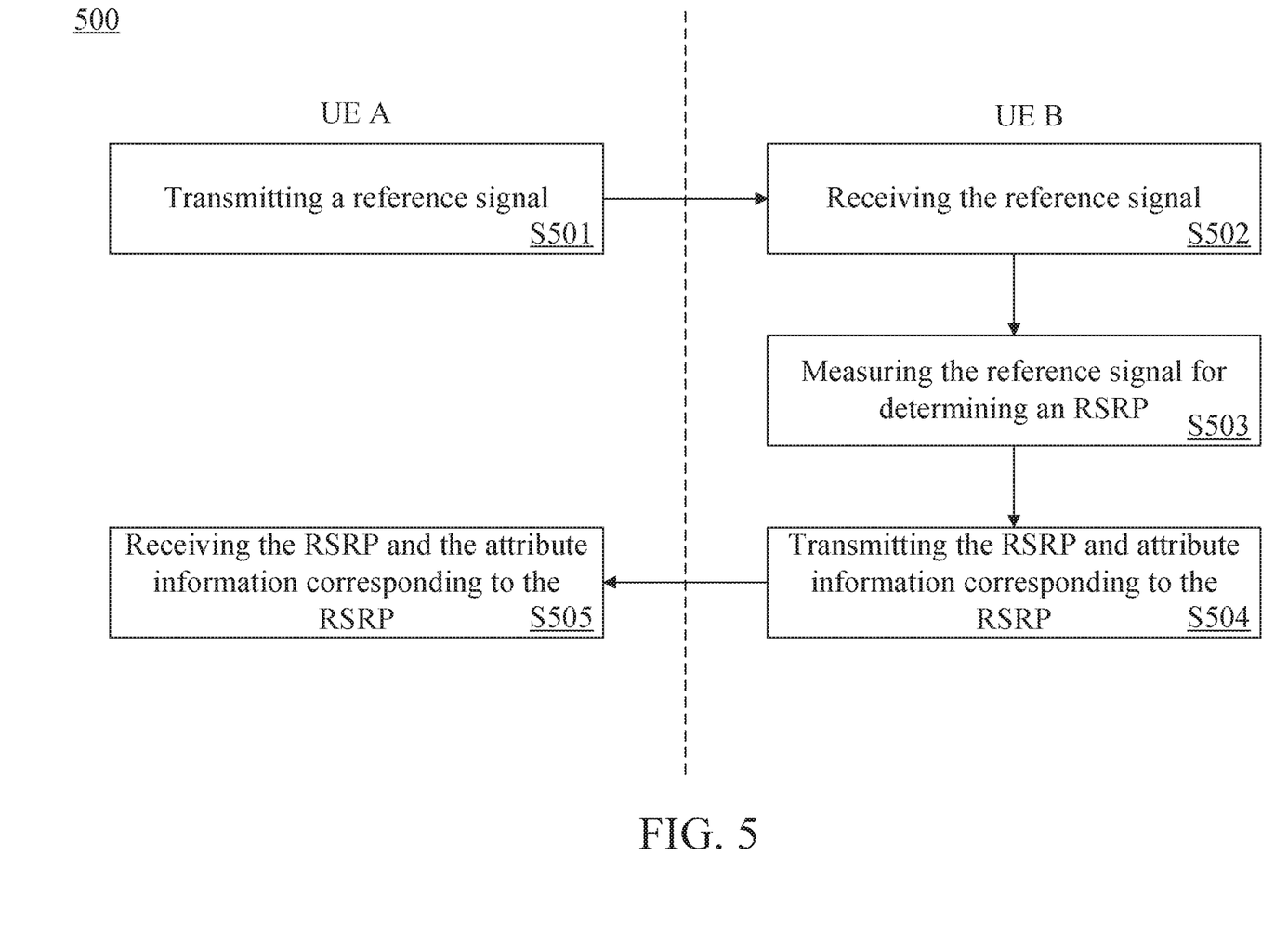
FIG. 5 illustrates a flow chart of a method for wireless communications according to an embodiment of the present disclosure.

FIG. 5 illustrates a flow chart of a method for wireless communication in accordance with some embodiments of the present application. Referring to FIG. 5, method 500 is performed by UE A and UE B (e.g., UE 101 and 102) in some embodiments of the present application.

Operation S501 is executed to transmit, by UE A, a reference signal to UE B. Operation S502 is executed to receive, by UE B, the reference signal from UE A. Operation S503 is executed to measure, by UE B, the reference signal for determining an RSRP. Operation S504 is executed to transmit, by UE B, the RSRP and an attribute information corresponding to the RSRP to UE A. Operation S505 is executed to receive, by UE A, the attribute information and the RSRP from UE B.

In some embodiments, the attribute information includes a type information of the RSRP. In detail, the type information may be utilized for indicating that the RSRP corresponds to a unicast communication or a groupcast communication between UE A and UE B.

In some embodiments, the type information may include an LCID indicating that the RSRP corresponds to the unicast communication or the groupcast communication between UE A and UE B. The LCID may be transmitted with a MAC-CE that includes the RSRP.

In some embodiments, the type information may include an indicator indicating that the RSRP corresponds to the unicast communication or the groupcast communication between UE A and UE B. The indicator may be transmitted with an SCI via a PSCCH that corresponds to a PSSCH carrying the RSRP.

In some embodiments, the type information may be utilized for indicating that the RSRP corresponds to a service type of a groupcast of UE 101. The service has an MCR.

In some embodiments, the type information may include an LCID indicating that the RSRP corresponds to the service type with the MCR. The LCID may be transmitted with a MAC-CE that includes the RSRP.

In some embodiments, the type information may include an indicator indicating that the RSRP corresponds to the service type with the MCR. The indicator may be transmitted with an SCI via the PSCCH that corresponds to a PSSCH carrying the RSRP.

Figure 6A:
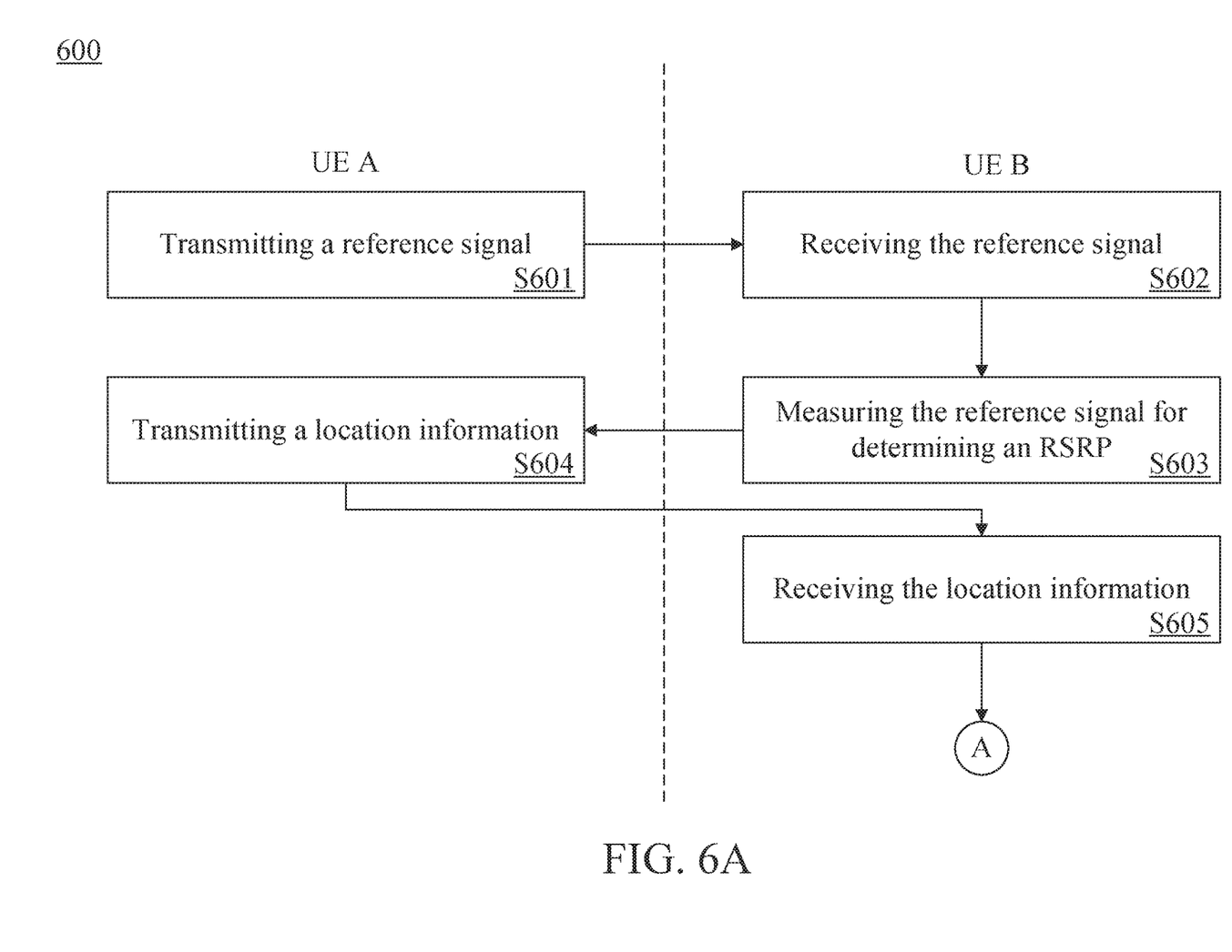
FIGS. 6A and 6B illustrate flow charts of a method for wireless communications according to an embodiment of the present disclosure.
Figure 6B:
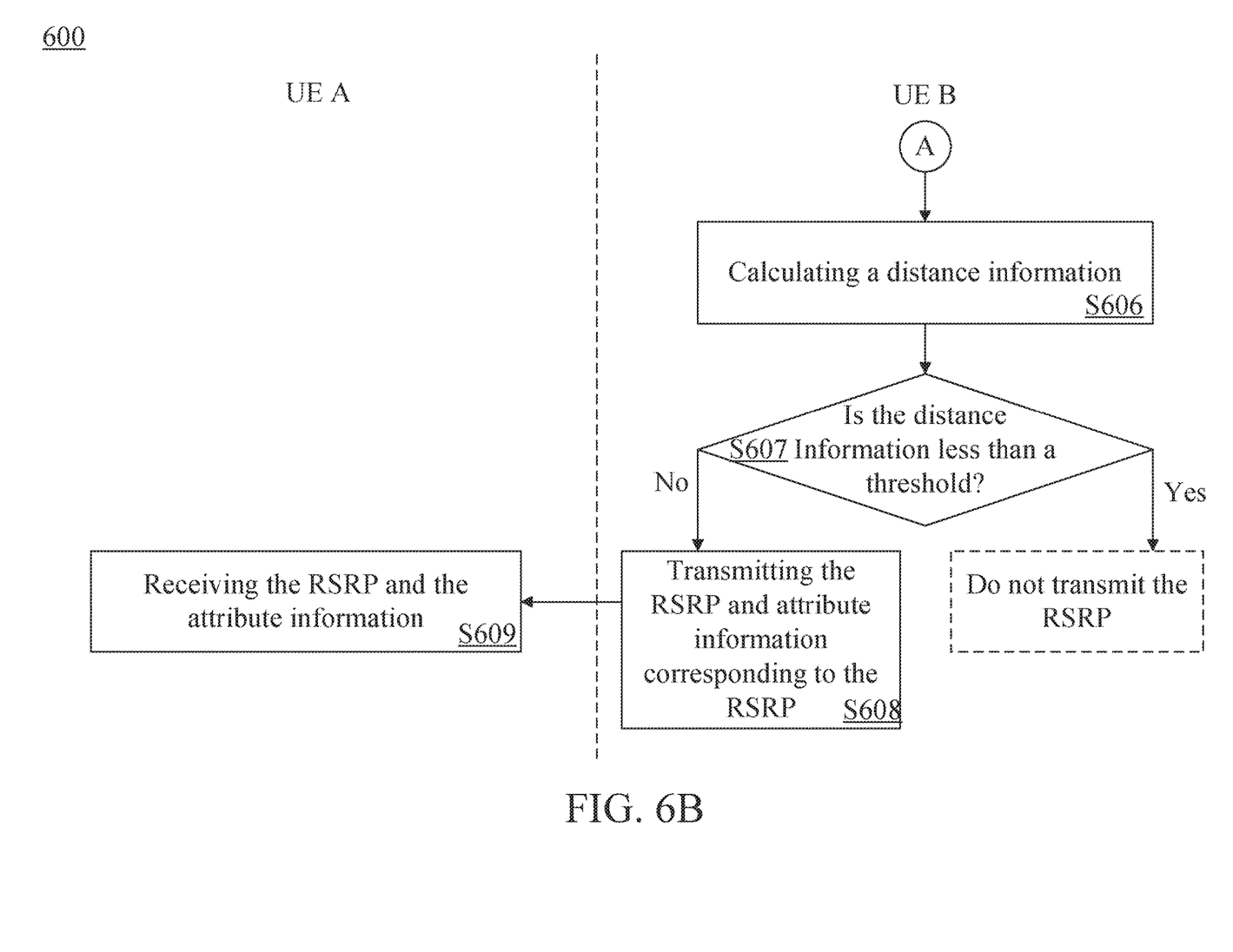

FIGS. 6A and 6B illustrate flow charts of a method for wireless communication in accordance with some embodiments of the present application. Referring to FIGS. 6A and 6B, method 600 is performed by UE A and UE B (e.g., UE 101 and 102) in some embodiments of the present application.

Operation S601 is executed to transmit, by UE A, a reference signal to UE B. Operation S602 is executed to receive, by UE B, the reference signal from UE A. Operation S603 is executed to measure, by UE B, the reference signal for determining an RSRP. Operation S604 is executed to transmit, by UE A, a location information of UE A. In some embodiments, the location information may include a zone identification of UE A.

Operation S605 is executed to receive, by UE B, the location information from UE A. Operation S606 is executed to calculate, by UE B, a distance information according to the location information of UE A and a location information of UE B. Operation S607 is executed to determine, by UE B, whether the distance information is less than a threshold.

When the distance information is less than a threshold, UE B may not transmit the RSRP to UE A. When the distance information is greater than the threshold, operation S608 is executed to transmit, by UE B, the RSRP and an attribute information corresponding to the RSRP to UE A. In some embodiments, the attribute information may include a geographic information that includes the distance information. Operation S609 is executed to receive, by UE A, the RSRP and the attribute information from UE B. In some embodiments, the distance information may include a distance value or a percentage of an MCR of a service of a groupcast from UE A.

Figure 7:
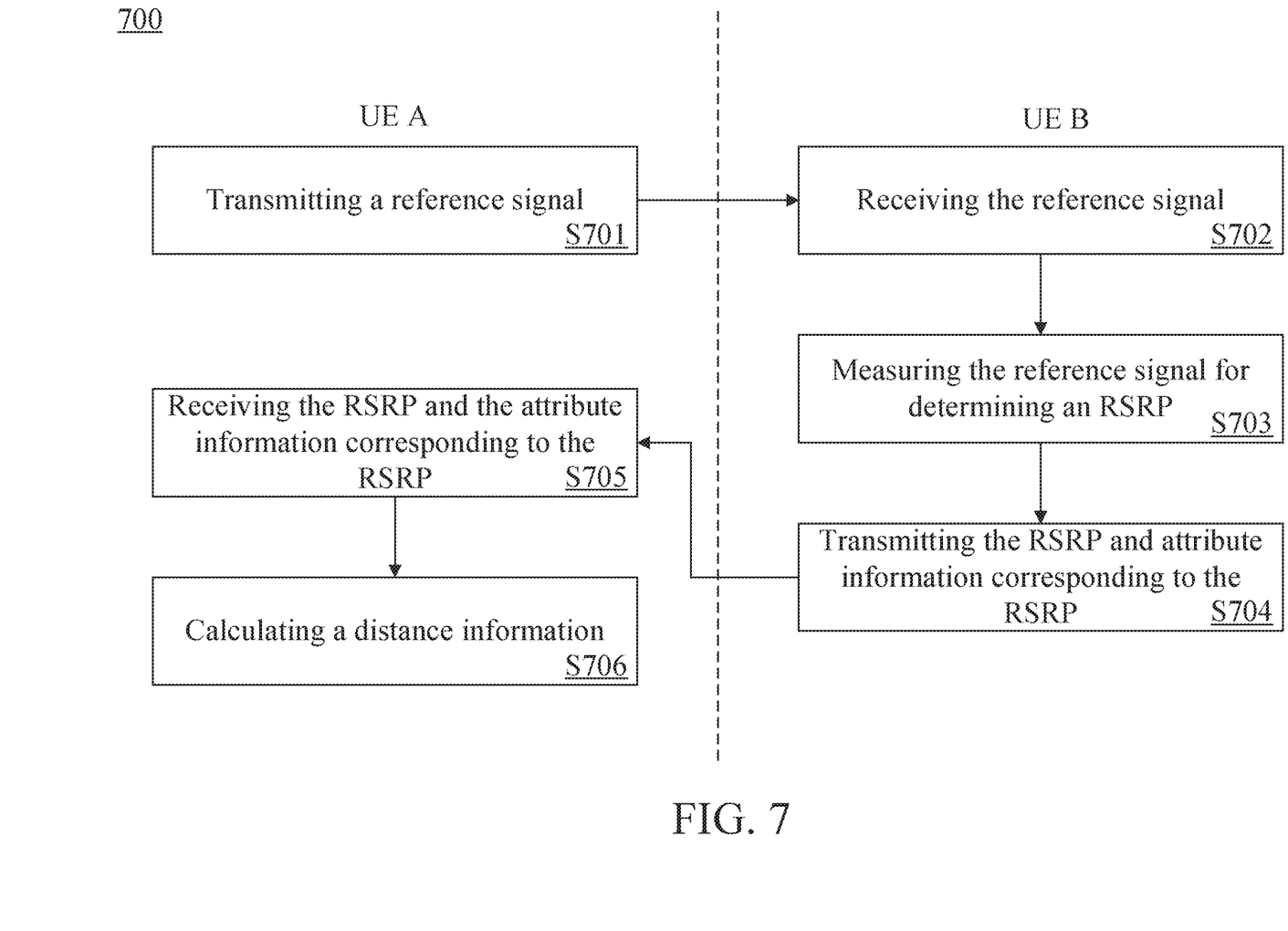
FIG. 7 illustrates a flow chart of a method for wireless communications according to an embodiment of the present disclosure.

FIG. 7 illustrates a flow chart of a method for wireless communication in accordance with some embodiments of the present application. Referring to FIG. 7, method 700 is performed by UE A and UE B (e.g., UE 101 and 102) in some embodiments of the present application.

Operation S701 is executed to transmit, by UE A, a reference signal to UE B. Operation S702 is executed to receive, by UE B, the reference signal from UE A. Operation S703 is executed to measure, by UE B, the reference signal for determining an RSRP. Operation S704 is executed to transmit, by UE B, the RSRP and an attribute information corresponding to the RSRP to UE A.

In some embodiments, the attribute information may include a geographic information that includes a location information (e.g., a zone identification) of UE B. Operation S705 is executed to receive, by UE A, the RSRP and the attribute information from UE B. Operation S706 is executed to calculate, by UE A, a distance information between UE A and UE B according to a location information of UE A and the location information of UE B.

Figure 8:
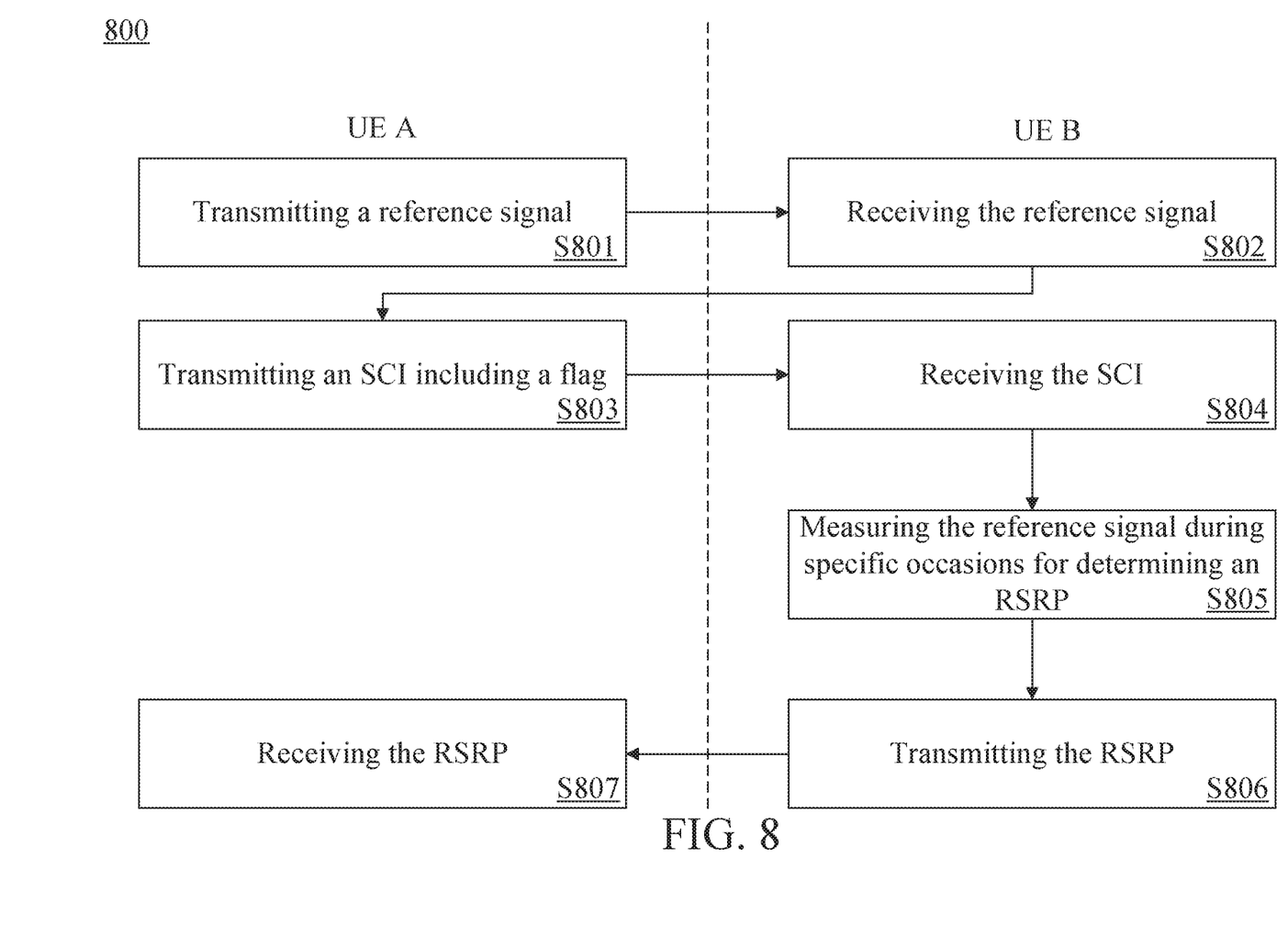
FIG. 8 illustrates a flow chart of a method for wireless communications according to an embodiment of the present disclosure.

FIG. 8 illustrates a flow chart of a method for wireless communication in accordance with some embodiments of the present application. Referring to FIG. 8, method 800 is performed by UE A and UE B (e.g., UE 101 and 102) in some embodiments of the present application.

Operation S801 is executed to transmit, by UE A, a reference signal to UE B. Operation S802 is executed to receive, by UE B, the reference signal from UE A. Operation S803 is executed to transmit, by UE A, an SCI to UE B. In some embodiments, the SCI may include a flag indicating a plurality of occasions corresponding to a unicast communication or a groupcast communication.

Operation S804 is executed to receive, by UE B, the SCI from UE A. Operation S805 is executed to measure, by UE B, the reference signal during the occasions for determining an RSRP. Operation S806 is executed to transmit, by UE B, the RSRP to UE A. Operation S807 is executed to receive, by UE A, the RSRP from UE B.

Figure 9:
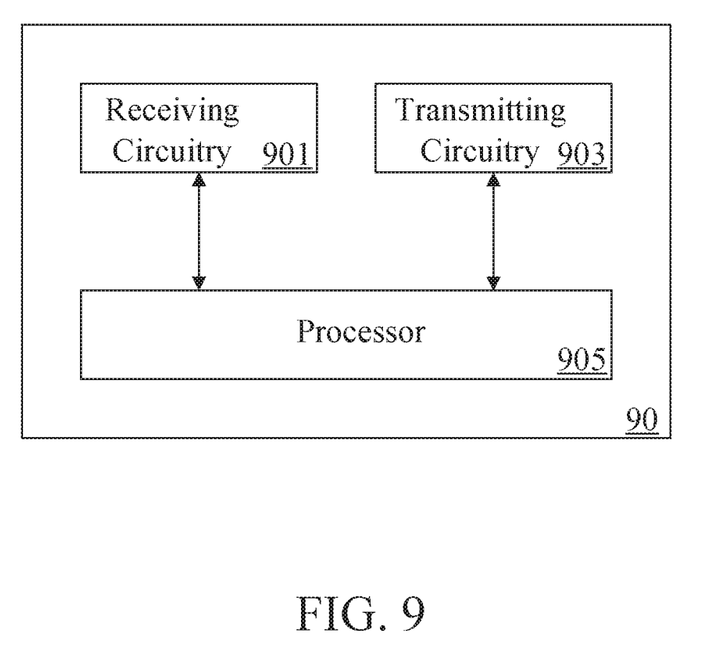
FIG. 9 illustrates an example block diagram of an apparatus according to an embodiment of the present disclosure.

FIG. 9 illustrates an example block diagram of an apparatus 90 according to an embodiment of the present disclosure.

As shown in FIG. 9, the apparatus 90 may include at least one non-transitory computer-readable medium (not illustrated in FIG. 9), a receiving circuitry 901, a transmitting circuitry 903, and a processor 905 coupled to the non-transitory computer-readable medium (not illustrated in FIG. 9), the receiving circuitry 901 and the transmitting circuitry 903. The apparatus 90 may be a user equipment.

Although in this figure, elements such as processor 905, transmitting circuitry 903, and receiving circuitry 901 are described in the singular, the plural is contemplated unless limitation to the singular is explicitly stated. In some embodiments of the present disclosure, the receiving circuitry 901 and the transmitting circuitry 903 are combined into a single device, such as a transceiver. In certain embodiments of the present disclosure, the apparatus 90 may further include an input device, a memory, and/or other components.

In some embodiments of the present disclosure, the non-transitory computer-readable medium may have stored thereon computer-executable instructions to cause a processor to implement the method with respect to the UEs as described above. For example, the computer-executable instructions, when executed, cause the processor 905 interacting with receiving circuitry 901 and transmitting circuitry 903, so as to perform the operations with respect to the UEs depicted in FIG. 1.

Those having ordinary skill in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

We claim:

1. A method performed by a user equipment (UE) for wireless communication, the method comprising:
   receiving a reference signal from another UE;
   measuring the reference signal for determining a reference signal receiving power (RSRP); and
   transmitting an attribute information corresponding to the RSRP to the another UE, wherein the attribute information includes a geographic information of the UE and a type information of the RSRP indicating to the another UE that the RSRP corresponds to a unicast communication or indicating to the another UE that the RSRP corresponds to a groupcast communication.

2. The method of claim 1, further comprising
   transmitting the RSRP to the another UE, wherein transmitting the attribute information comprises transmitting the attribute information such that the attribute information is indicated to the another UE separately from the RSRP.

3. The method of claim 1, wherein the type information includes a logical channel identification (LCID) indicating that the RSRP corresponds to the unicast communication or the groupcast communication, and the LCID is transmitted with a medium access control (MAC) control element (MAC-CE) which includes the RSRP.

4. The method of claim 1, wherein the type information includes an indicator indicating that the RSRP corresponds to the unicast communication or the groupcast communication, and the indicator is transmitted with a sidelink control information (SCI) via a physical sidelink control channel (PSCCH) which corresponds to a physical sidelink shared channel (PSSCH) carrying the RSRP.

5. The method of claim 1, further comprising:
   receiving a sidelink control information (SCI) from the another UE, wherein the SCI includes a flag of indicating a plurality of occasions corresponding to the unicast communication or the groupcast communication;
   wherein measuring the reference signal further comprises:
   measuring the reference signal during the occasions for determining the RSRP.

6. The method of claim 1, wherein the geographic information includes a distance information between the UE and the another UE, and transmitting the attribute information further comprises:
   transmitting the distance information with the RSRP to the another UE.

7. The method of claim 6, further comprising:
   receiving a location information from the another UE; and
   calculating the distance information according to the location information of the another UE and a location information of the UE.

8. The method of claim 6, wherein the distance information includes a distance value or a percentage of a minimum communication range (MCR) of a service of a groupcast from the another UE.

9. The method of claim 1, wherein the geographic information includes a location information, and the location information is transmitted with a sidelink control information (SCI) via a physical sidelink control channel (PSCCH) which corresponds to a physical sidelink shared channel (PSSCH) carrying the RSRP.

10. The method of claim 1, wherein the type information indicates that the RSRP corresponds to a service type, which has a minimum communication range (MCR), of a groupcast from the another UE.

11. The method of claim 1, further comprising:
    receiving a sidelink control information (SCI) from the another UE, wherein the SCI includes an indication of transmitting power of the another UE; and
    normalizing the RSRP according to the indication of transmitting power and a designated transmitting power.

12. A user equipment (UE) for wireless communication, the UE further comprising:
    at least one memory; and
    at least one processor coupled with the at least one memory and configured to cause the UE to:

transmit a reference signal to another UE so that the another UE measures the reference signal for determining a reference signal receiving power (RSRP); and receive an attribute information corresponding to the RSRP from the another UE, wherein the attribute information includes a geographic information of the UE and a type information of the RSRP indicating to the another UE that the RSRP corresponds to a unicast communication or indicating to the another UE that the RSRP corresponds to a groupcast communication.

13. The UE of claim 12, wherein:

the type information includes a logical channel identification (LCID) indicating that the RSRP corresponds to the unicast communication or the groupcast communication, and the LCID is received with a medium access control (MAC) control element (MAC-CE) which includes the RSRP.

14. The UE of claim 12, wherein the at least one processor is further configured to cause the UE to:

transmit a sidelink control information (SCI) to the another UE, wherein the SCI includes a flag of indicating a plurality of occasions corresponding to the unicast communication or the groupcast communication.

15. The UE of claim 12, wherein the geographic information includes a distance information between the UE and the another UE, and the at least one processor causing the UE to receive the attribute information further comprises:

causing the UE to receive the distance information with the RSRP from the another UE.

16. The UE of claim 15, wherein the at least one processor is futher configured to cause the UE to:

transmit a location information to the another UE so that the another UE calculates the distance information according to the location information of the UE and a location information of the another UE.

17. The UE of claim 12, wherein the geographic information includes a location information, and the location information is received with a sidelink control information (SCI) via a physical sidelink control channel (PSCCH) which corresponds to a physical sidelink shared channel (PSSCH) carrying the RSRP, and the at least one processor is further configured to cause the UE to:

calculate a distance information between the another UE and the UE according to the location information of the another UE and a location information of the UE.

18. The UE of claim 12, wherein the type information indicates that the RSRP corresponds to a service type, which has a minimum communication range (MCR), of a groupcast.

19. The UE of claim 12, wherein the at least one processor is further configured to cause the UE to:

transmit a sidelink control information (SCI) to the another UE, wherein the SCI includes an indication of transmitting power of the UE so that the another UE normalizes the RSRP according to the indication of transmitting power and a designated transmitting power.

20. A processor for wireless communication, comprising:

at least one controller coupled with at least one memory and configured to cause the processor to:

receive a reference signal from a user equipment (UE);

measure the reference signal for determining a reference signal receiving power (RSRP); and transmit an attribute information corresponding to the RSRP to the UE, wherein the attribute information includes a geographic information of the UE and a type information of the RSRP indicating to the UE that the RSRP corresponds to a unicast communication or indicating to the UE that the RSRP corresponds to a groupcast communication.

* * * * *